United States Patent
Johnson

(10) Patent No.: US 6,286,281 B1
(45) Date of Patent: Sep. 11, 2001

(54) TUBULAR TAPERED COMPOSITE POLE FOR SUPPORTING UTILITY LINES

(76) Inventor: David W. Johnson, 1884 Sunset Blvd., San Diego, CA (US) 92103

( * ) Notice: Subject to any disclaimer, the term of this patent is extended or adjusted under 35 U.S.C. 154(b) by 0 days.

(21) Appl. No.: 09/311,338

(22) Filed: May 13, 1999

Related U.S. Application Data

(63) Continuation-in-part of application No. 08/881,974, filed on Jun. 25, 1997, now abandoned, which is a continuation-in-part of application No. 08/128,800, filed on Sep. 28, 1993, now Pat. No. 5,749,198, which is a continuation-in-part of application No. 07/715,912, filed on Jun. 14, 1991, now Pat. No. 5,247,774.

(51) Int. Cl.[7] .................................................. E04H 12/02
(52) U.S. Cl. .................... 52/592.1; 52/309.9; 52/651.02; 52/736.1
(58) Field of Search .......................... 52/309.9, 592.1, 52/651.01, 651.02, 732.3, 736.1, 736.3, 738.1

(56) References Cited

U.S. PATENT DOCUMENTS

| | | | | |
|---|---|---|---|---|
| 466,012 | * | 12/1891 | Seaman | 52/732.3 |
| 999,267 | * | 8/1911 | Slick | 52/732.3 X |
| 3,196,990 | * | 7/1965 | Handley | 52/732.3 |
| 3,276,182 | * | 10/1966 | Handley | 52/732.3 |
| 3,291,437 | * | 12/1966 | Bowden et al. | 52/738.1 X |
| 3,557,422 | * | 1/1971 | Pfaff, Jr. | 52/732.3 X |
| 3,571,991 | * | 3/1971 | Doocy et al. | 52/651.02 X |
| 3,868,796 | * | 3/1975 | Bush | 52/309.9 X |
| 4,312,162 | * | 1/1982 | Medney | 52/736.3 X |
| 5,247,774 | * | 9/1993 | Johnson | 52/651.02 X |
| 5,285,613 | * | 2/1994 | Goldsworthy et al. | 52/651.01 X |
| 5,319,901 | * | 6/1994 | Goldsworthy et al. | 52/651.02 |
| 5,617,692 | * | 4/1997 | Johnson et al. | 52/651.02 |
| 5,644,888 | * | 7/1997 | Johnson | 52/651.02 X |
| 5,749,198 | * | 5/1998 | Johnson | 52/651.02 X |
| 5,864,998 | * | 2/1999 | Loomer | 52/738.1 X |

* cited by examiner

Primary Examiner—Carl D. Friedman
Assistant Examiner—Kevin D. Wilkens
(74) Attorney, Agent, or Firm—Charles C. Logan II

(57) ABSTRACT

A tubular tapered composite pole for supporting utility lines and a method for making the same. The pole is formed from a plurality of elongated panels made of pultruded composite material having a height H1 in the range of 30 feet–120 feet. An interlocking structural groove is formed on one of the side edges of the panel during the pultrusion process. The other side edge of the panel is formed by a biased angle cut from the bottom edge of the panel to its top edge to give it a generally trapezoidal shape. A tongue shaped interlocking structure is machined along the length of the angularly cut side edge. The panels have a length L1 along their bottom edge in the range of 6"–24" and a length L2 along their top edges in the range of 3"–16". The respective tongue and groove structure along the side edges of the panels is interlocked together to form a closed loop extending from their top edges to their bottom edges to form the tubular tapered pole. The special double structural groove, known as a fir tree joint is designed to allow insertion elastically, and then provide significant clamping pressure once interlocked.

11 Claims, 10 Drawing Sheets

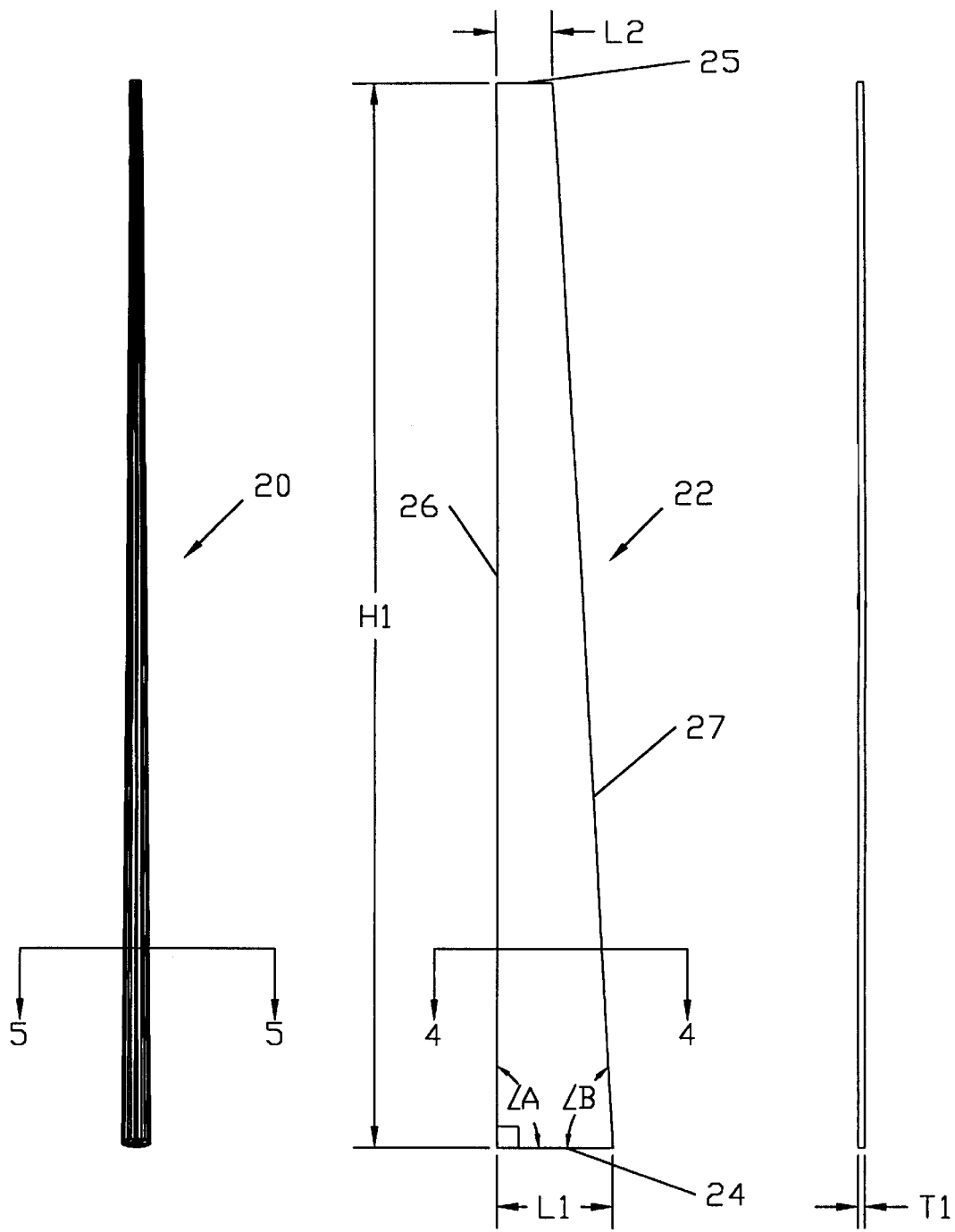

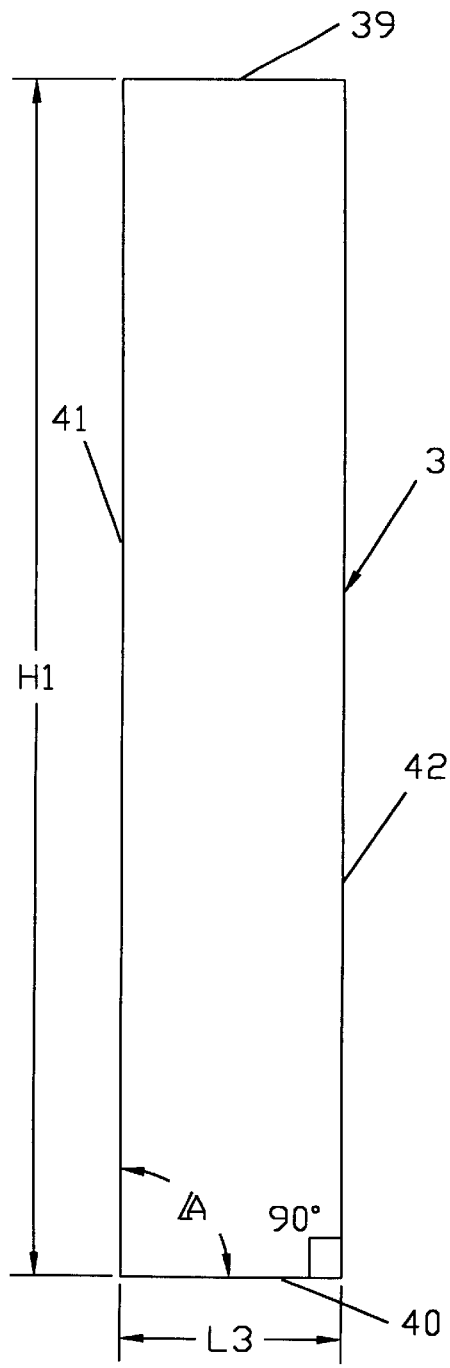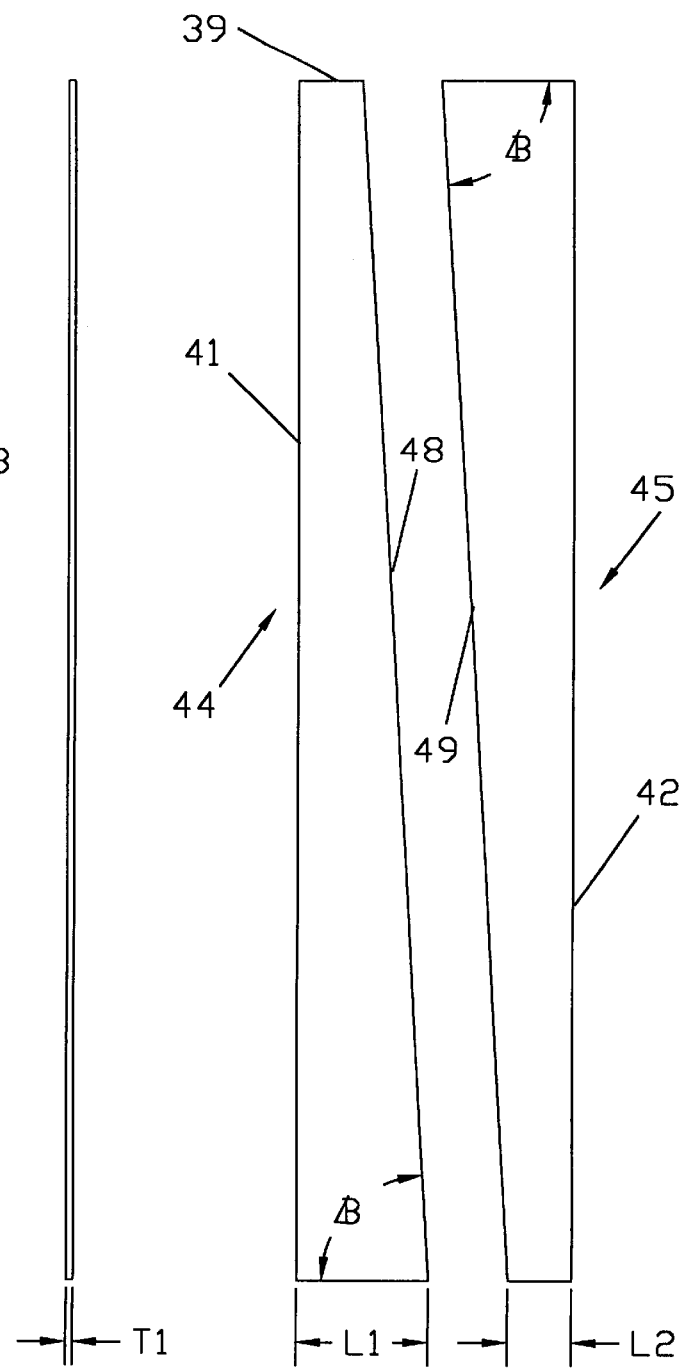
FIG. 6  FIG. 7  FIG. 8

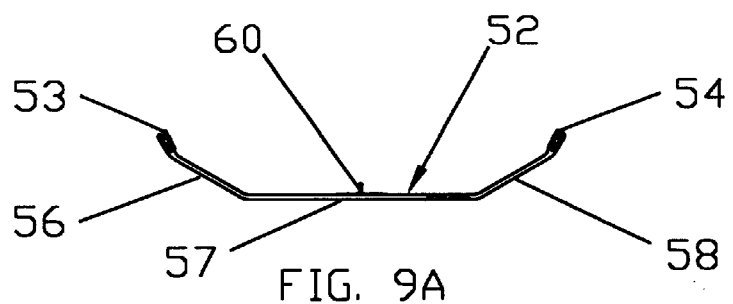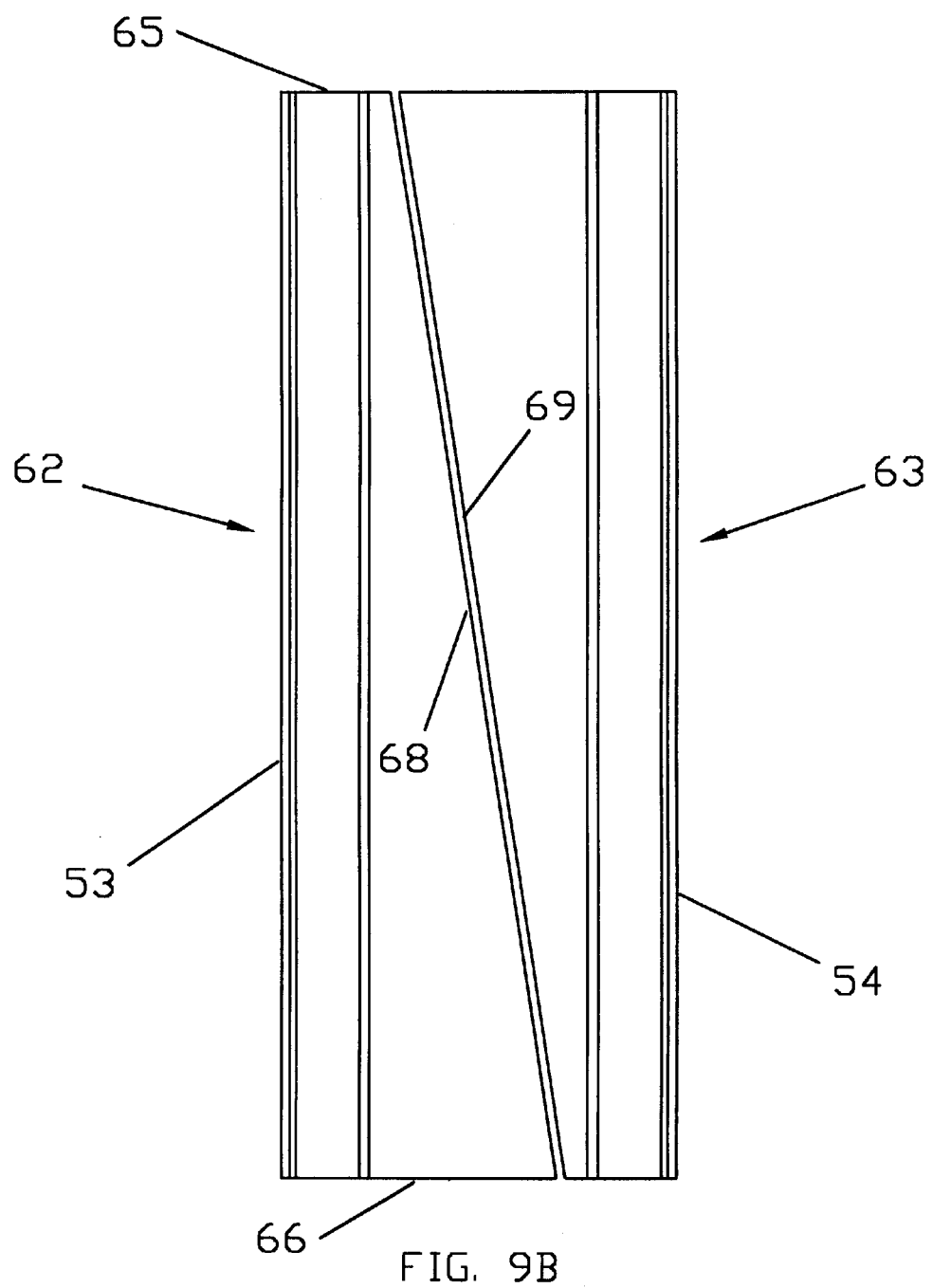

TUBULAR TAPERED COMPOSITE POLE FOR SUPPORTING UTILITY LINES

This application is a continuation-in-part of U.S. patent application Ser. No. 08/881,974 filed on Jun. 25, 1997, now abandoned which was a continuation-in-part of U.S. patent application Ser. No.: 08/128,800 filed on Sep. 28, 1993 for a tapered composite elevated support structure that issued on May 12, 1998 as U.S. Pat. No. 5,749,198. That patent was a continuation-in-part of U.S. patent application Ser. No. 715,912 filed Jun. 14, 1991, issuing Sep. 28, 1993, as U.S. Pat. No. 5,247,774 on a tower constructed of pultruded composites. That patent was a continuation-in-part of U.S. application Ser. No. 07/541,547 filed Jun. 21, 1990, issued on Jun. 18, 1991 as U.S. Pat. No. 5,024,036 on an invention entitled interlocking support structures, which was a continuation-in-part of U.S. application Ser. No. 07/231,379 filed Aug. 12, 1988, issued on Feb. 12, 1991 as U.S. Pat. No. 4,991,726 on an invention entitled support stand, that was a continuation-in-part of both: U.S. application Ser. No. 07/137,101 filed Dec. 23, 1987, issued on Feb. 28, 1989, as U.S. Pat. No. 4,809,146 on an enclosure with interlocking frame joints and U.S. application Ser. No. 07/137,100 filed Dec. 23, 1987, issued on May 2, 1989 as U.S. Pat No. 4,825,620, on a structural support of interlocking lattice construction, both of which were continuations-in-part of U.S. application Ser. No. 06/848,573, filed Apr. 7, 1986, issued Dec. 29, 1987 as U.S. Pat. No. 4,715,503 on an interlocking joint wine rack.

BACKGROUND OF THE INVENTION

The invention relates to poles for supporting utility lines and more specifically to a hollow tapered pole formed from a plurality of pultruded composite panels.

Presently utility line poles are generally made of wood, steel or concrete. Wood poles are known by the industry to have many existing and long-term problems. These include supply, the use of environmentally questionable treatment such as creosote and pentachlorophenol, and the issue of environmental attack on the life of the pole due to problems with fungus, rot and animal attack. Wood continues to have questions relative to the environmental safety of the preservatives. In some cases, the disposal of the poles has presented questions resulting in unclear direction regarding landfill acceptability and recycling. Existing alternatives include tubular light duty steel poles, which are designed in a twelve-sided configuration, and concrete poles. Both provide equivalent performance to wood, but have significant problems regarding weight, shipping constraints, corrosion and in some cases first costs. Wood appears to be the popular choice of utilities if availability exists due to primarily low initial costs.

In U.S. Pat. No. 5,222,344, the inventor, Johnson, discloses a utility pole having an upper section formed of pultruded composites. In one embodiment, an interior lattice of composite members forms an elongated open celled beam which is enclosed in a preferably composite outer skin.

There are some utility poles utilizing composite processes such as filament winding and centrifugal casting. The drawback to these processes are that they require a mold or a mandrel. Also the maximum height for these type of composite poles appears to be in the 50–55 foot range.

The need for utility poles in the height range of 65–120 feet is presently being served by wooden poles. These poles are quite expensive and the time delay from ordering to delivery is long. Light duty steel poles and concrete poles in this height range are expensive, have long lead times, and are exceptionally heavy.

It is an object of the invention to provide a novel composite pole for supporting utility lines that has a tapered shape.

It is also an object of the invention to provide a novel composite pole for supporting utility lines that in lengths greater than 60 feet are lighter than wooden poles, steel poles or concrete poles.

It is another object of the invention to provide novel composite poles for supporting utility lines that would weigh less than 1000 pounds and thus allow them to be transported by light duty helicopters to remote installation sites.

It is an additional object of the invention to provide a novel composite pole for supporting utility lines that does not have any of the undesirable environmental objections such as are common with the use of timber poles.

It is a further object of the invention to provide a novel composite pole for supporting utility lines that is economical to manufacture and market.

SUMMARY OF THE INVENTION

The tubular tapered composite pole for supporting lines provides an alternative to wood poles in transmission class applications for new and replacement installations. There are several benefits from using poles formed from pultruded composite material. These type of poles would not use chemical preservatives such as wooden poles require, thus eliminating disposal and liability issues from the preservatives. Composite poles have an eighty year life and will not deteriorate in the environment and do not require preservatives to protect them from insects and the weather. The composite poles are resistant to pests such as woodpeckers and such other boring birds and insects. Also when the life span of a composite pole ends its inert material is recyclable. Much of the maintenance required for wooden poles would be eliminated by the use of composite poles. The composite poles are also much lighter than wooden poles making them much easier to transport and easier to install. This light weight feature makes them attractive versus steel and concrete also, resulting in much lower installation costs.

The novel tubular tapered composite pole is formed from a plurality of pultruded panels. These panels extend in length from 30–120 feet or longer. Since the dies used in the pultrusion process can only make panels having a constant width, it is necessary that certain machining operations be done to the initial panels that are formed. Preferably, the panels would have a groove structure formed along its length on one of the side edges of the panel. A biased cut would be made from the top edge of the panel to its bottom edge to form a trapezoidal shaped panel. An interlocking tongue structure would be machined on to the edge of the biased cut side edge of the panel, made at the same time as the biased cut using advanced CNC machinery. The combined tongue and groove structure that the inventor utilizes has been given the name of a fir tree joint. A plurality of the aforementioned panels are assembled together with their respective tongue interlocking structure captured in the respective groove structure of the adjacent panels. These interlocking structures may also have adhesive material applied to their surfaces. The resulting structure is a tapered elongated tubular composite pole for supporting utility lines. The diameter of these utility poles would be in the range of 16–40 inches at their base and 5–16 inches at their top.

The interlocking fir tree joint is an important feature of this invention. Composite materials can have the strength of steel, but have a modulus of elasticity that is 1/7th that of steel. This means the material can deflect under high load, but not yield or permanently change shape. This characteristic is advantageous to the successful manufacturing of a composite pole and the double snap groove configuration of the fir tree joint is a key feature. When assembling six panels of a composite pole using the fir tree joint, tremendous force is required to open up the entrance to the groove side of the joint. This is accomplished with a proprietary machine that applies inward pressure to each panel. Once the joint is completely interlocked, the manufacturer knows the assembly is complete due to a loud "snap". The joint is thus held together with several thousand pounds of clamping force, equivalent to the several thousand pounds of force required to snap the joint together initially.

Once this fir tree is snapped together, the machining process is significantly complete. If adhesives are used in the joint the high pressure clamp force provides a dual feature. First by dimensioning the fir tree joint correctly, a fixed bond line (thickness) can be controlled. Any excess adhesive in the groove will be squeezed out of the joint and the optimum bond line for strength can be achieved. Secondly, the excessive clamping force of the assembled fir joint is absolutely mandatory for achieving a satisfactory bond joint. It is well known in adhesives that a clamp force is required to permit an acceptable cure. If it were not for the fir tree joint, bond pressure would need to be applied on the outside and inside of every inch of seam over the entire pole. With 30 minute cure adhesives (state-of-the-art) there is not time to put secondary clamps on the seams. There is no conceivable method to apply force on the inside of the pole with specialized tooling. An 80 foot pole is 960 inches in length. With 6 joints per pole this is 5760 lineal inches of seams. This means a mechanical tool would need to quickly clamp 5760 lineal inches on the outside of the pole and a second internal clamp would need to apply outward pressure to an additional 5760 inches of seam on the inside. This would have to be done within 30 minutes of assembling the pole. The fir tree joint eliminates this expensive tool requirement.

Finally, the fir tree joint assists with the prevention of slippage in the joint. An 80 foot pole without the clamp pressure assistance of the fir tree joint would slip and bend under its own weight. This bending would result in a poor bond as mentioned earlier (due to lock of clamping pressure) and the pole would be bent or cambered.

One embodiment of the invention utilizes pultruded panels that are produced in a die and have an interlocking groove formed along both of its left and right side edges. Additionally, the panel would be formed of multiple planar sections that intersect each other at obtuse angles. By making a biased cut at a predetermined angle from the top edge of the panel to its bottom edge, a pair of identical trapezoidal panels can be formed. Each of these panels would thus have its own integrally formed grooves adjacent one of its side edges. The biased side edge of each of the two panels would then have an interlocking tongue structure machined thereon that would mate with the pultruded grooved structure. This allows a minimum number of pultruded panels to be formed and which when cut at a biased angle produces double that number of assembly panels. Therefore, as few as three pultruded panels can be used for assembling a tubular tapered composite pole for supporting utility lines.

Composite poles can be made covering all of the classes from Class 1-10 to Class H-6 by varying the thickness of the pultruded panels. In order to cut down on the weight of the panels, and reduce their thickness, there are several ways of adding reinforcing structure to the inner surface of the panels. Some of these are T-shaped reinforcing ribs, inverted L-shaped reinforcing ribs and mushroom-shaped reinforcing ribs. Additionally, a secondary panel can be formed during the pultrusion process and secured to the rear surface of the primary panel while leaving an open space between them. This space may be left open or it may be filled with a foam material.

The composite poles can be assembled in a factory or they can be shipped as individual panels to an installation site where they can be assembled together. Although the tongue and groove, fir tree interlocking joints utilized provide an excellent connection, bonding agents can also be applied to the mating surfaces prior to their being snapped together into place.

DESCRIPTION OF THE DRAWINGS

FIG. 1 is a front perspective view of the novel tubular tapered composite pole for supporting utility lines;

FIG. 2 is a front elevation view of one of the panels used to form the utility pole;

FIG. 3 is a side elevation view of the panel illustrated in FIG. 2;

FIG. 6 is a front elevation view of one of the pultruded panels as initially formed;

FIG. 7 is a side elevation view of the panel illustrated in FIG. 6;

FIG. 8 is an exploded front elevation view of the pultruded panel illustrated in FIG. 6 after a biased cut has been made from its bottom edge to its top edge to form a pair of trapezoidal,.shaped panels;

FIG. 9A is a top plan view of a first alternative pultruded composite panel;

FIG. 9B is an exploded front elevation view of the pultruded panel illustrated in FIG. 9A after a biased cut has been made from its bottom edge to its top edge to form a pair of trapezoidal shaped panels;

DESCRIPTION OF THE PREFERRED EMBODIMENT

Figure 4:
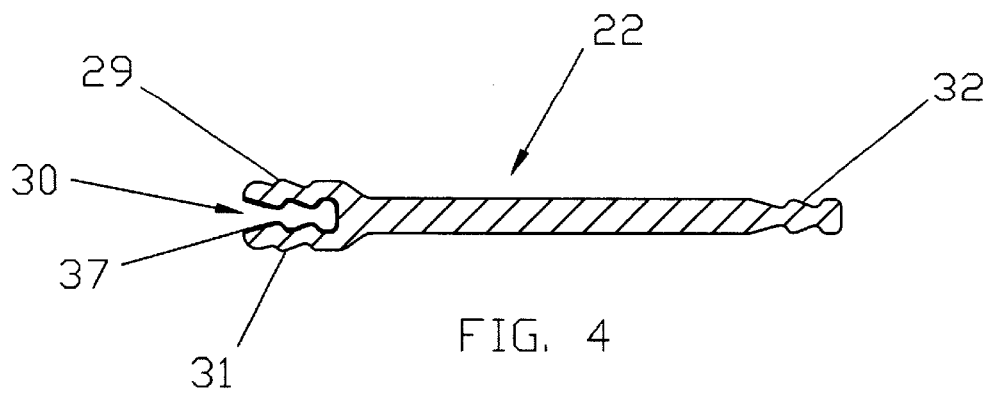
FIG. 4 is an enlarged cross sectional view taken along lines 4—4 of FIG. 2.

The novel tubular tapered composite pole for supporting utility lines and its method of manufacture will now be described by referring to FIGS. 1–16 of the drawings.

The tubular tapered composite pole is illustrated in FIG. 1 and it is generally designated numeral 20. It is formed of a plurality of elongated panels 22 made of pultruded composite material. Each of these panels have a height Hi in the range of 30–120 feet. They have a bottom edge 24, a top edge 25, a left side edge 26 and a right side edge 27. The length L1 along bottom edge 24 is in the range of 6"–24" and the length L2 along top edge 25 is in the range of 3"–16". The panels 22 have a constant thickness T1 since pultrusion cannot make panels that are tapered in thickness or in width. Ti is in the range of 0.100–0.800 inches.

FIG. 4 illustrates a cross sectional view of panel 22 and it shows a groove 30 extending along one of its edges. Side edge 26 makes a 90 degree angle A with bottom edge 24. This allows a fir tree-shaped groove 30 to be formed during the pultrusion process. Edge 27 makes an acute angle with bottom edge 24 and this is formed by cutting at a predetermined angle B from bottom edge 24 to top edge 25. This is necessary since only a constant width panel can be formed by the pultrusion method. Side edge 27 has a tongue 32 machined thereon having a predetermined fir tree-shaped configuration. The predetermined configuration of tongue 32 and the internal surface of groove 30 is identified by the inventor as a fir tree joint. Groove 30 has an outer jaw 29 and an inner jaw 31. The spacing between the inner surfaces of jaws 29 and 31 is less than T1 at their closest point. The thickness of tongue 32 is no greater than T1 at any point.

Figure 4A:
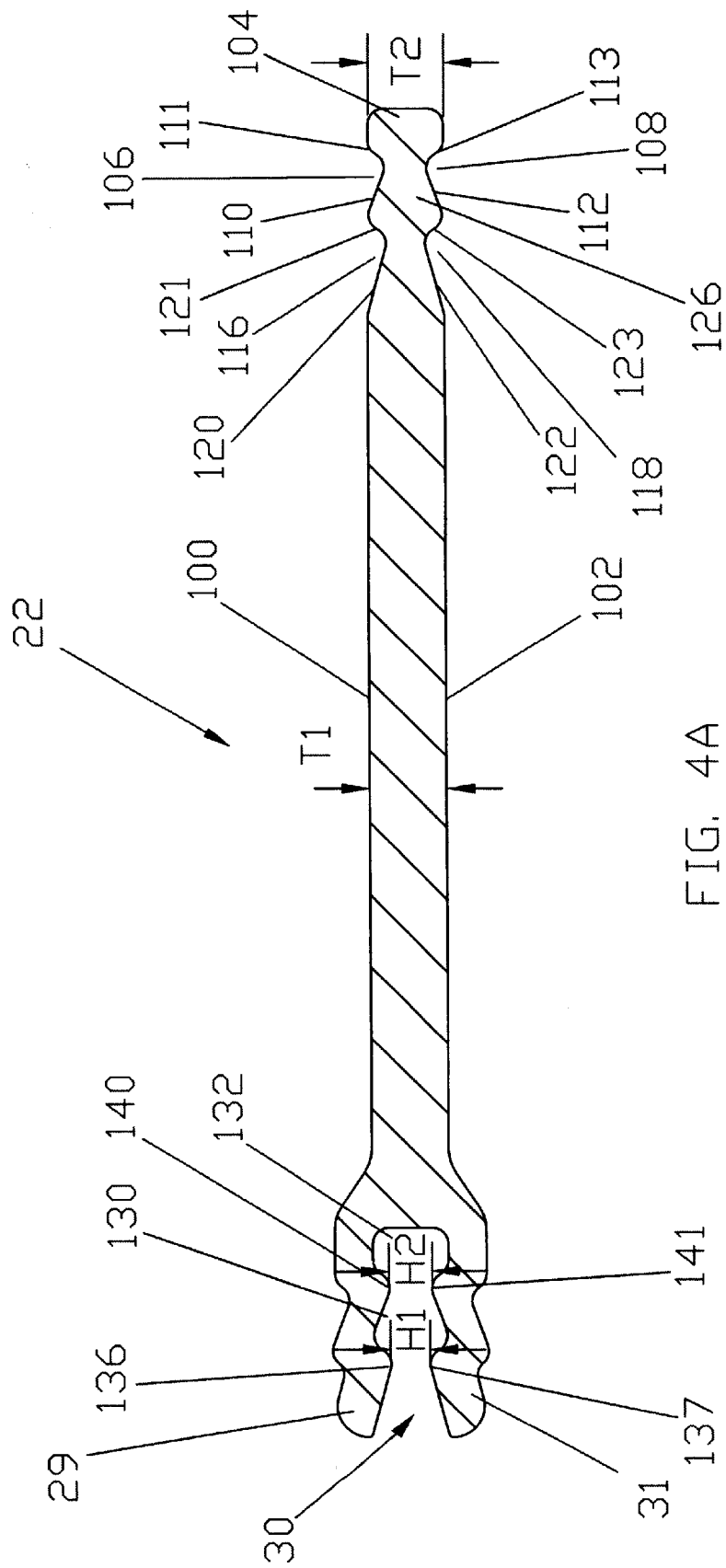
FIG. 4A is an enlarged view of FIG. 4.

A better understanding of the fir tree joints will be understood by referring to FIG. 4A which is an enlarged drawing of FIG. 4. Panel 22 has an outer surface 100 and an inner surface 102. The tongue portion 32 of the fir tree joint has a head portion 104 at its outer end having a thickness no greater than T1. Spaced inwardly from head portion 104 is a first outer surface machined groove 106 and a first inner surface machined groove 108. First outer surface machined groove 106 is formed by converging surfaces 110 and 111. First inner surface machined groove 108 is formed by converging surfaces 112 and 113. Spaced inwardly from the respective first outer and first inner surface machined grooves 106 and 108 are second outer surface machined groove 116 and second inner surface machined groove 118. Second outer surface machine groove 116 is formed by converging surfaces 120 and 121. Second inner surface machined groove 118 is formed by converging surfaces 122 and 123. A double sided tooth portion 126 is formed in tongue portion 22 by converging surfaces 110, 112, 121, and 123.

Groove portion 30 of the fir tree joint has an outer jaw 29 and an inner jaw 31 and groove 30 is formed therebetween. Groove 30 has a first locking cavity 130 and a second locking cavity 132. Ridges 136 and 137 on the respective jaws 29 and 31 are separated by a height Hi that is less than T2, so that they have to be spread apart in order for head portion 104 to enter therebetween. Ridges 140 and 141 on the inner surface of outer jaw 29 and inner jaw 31 are separated by a distance H2 that is less than T2 so that the jaws have to be spread apart in order for head portion 104 to enter second locking cavity 132 while double sided tooth portion 126 enters first locking cavity 130.

When the tongue portion of the fir tree joint is in inserted into the groove portion of the fir tree joint, the jaws 29 and 31 are caused to flexibly but with great resistance spread apart and then snap back together and compressively grip the tongue portion 32 when head portion 104 and double sided tooth portion 126 have been received in the respective cavities 132 and 130. This produces a mechanical joint having double locking structure and prevents pivoting action by adjacent panels that have been secured together. When a bonding adhesive 37 is applied to the mating surfaces of the fir tree joints, it is important that the two mating structures are firmly gripped and do not slip longitudinally or laterally during bonding in order to cure the bond. With panels that are assembled together to form poles it is impossible to put clamps inside to hold the mating edges together while bonding. The novel double snap joint fir tree joint applies continuous locking pressure along its length while the adhesive cures during post-assembly handling.

Figure 5:
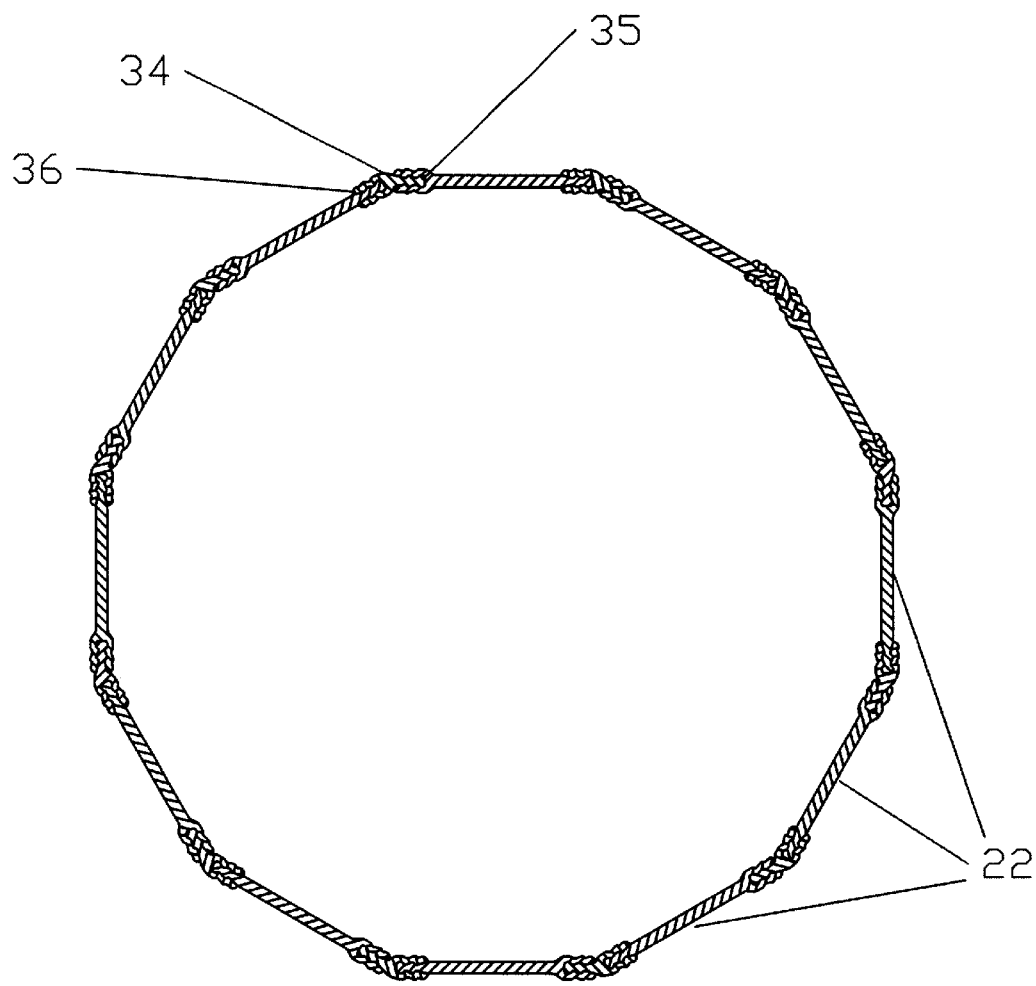
FIG. 5 is an enlarged cross sectional view taken along lines 5—5 of FIG. 1.

A plurality of panels 22 are illustrated interlocked together in FIG. 5. A corner coupling 34 has a tongue 35 and a groove 36 that are interlockingly snapped together with the respective groove 30 and tongue 32 of panel 22. Corner couplings 34 extend the entire height of pole 20.

The shape of the pultruded panel as it exits the die is illustrated in FIGS. 6–8. This blank is generally designated numeral 38. It has a top edge 39, a bottom edge 40, a left side edge 41 and a right side edge 42. It has a height H1 and a constant width L3. It has a thickness T1 and side edge 41 makes a 90 degree angle A with bottom edge 40. Likewise side edge 42 also makes a 90 degree angle with bottom edge 40. FIG. 8, illustrates how two identical trapezoidal panels 44 and 45 are formed by making a biased angular cut from top edge 39 to bottom edge 40. Trapezoidal panel 44 thus has a new right side edge 48 that makes an acute angle B with bottom edge 40. Trapezoidal panel 45 then has a new right side edge 49 when it is rotated 180 degrees. Right side edge 49 also makes an acute angle B with what previously had been top edge 39.

A first alternative pultruded composite panel 52 is illustrated in FIG. 9A. It has a groove 53 formed adjacent its left side edge and a groove 54 formed adjacent its right side edge. It has a plurality of planar sections 56, 57 and 58 that intersect each other at an obtuse angle. A reinforcing rib 60 extends outwardly from the inner surface of panel 52. By referring to FIG. 9B, it can be easily understood how two identical trapezoidal panels 62 and 63 are formed by making a biased cut from top edge 65 all of the way down to bottom edge 66. When panel 63 is rotated 180 degrees, it is identical to panel 62. The respective side edges 68 and 69 of the respective panels 62 and 63 then have machined tongues 72 formed along their length and this allows the adjacent panels to be snapped together to form a closed loop such as illustrated in FIGS. 10A, 10B, and 10C.

Figure 10A:
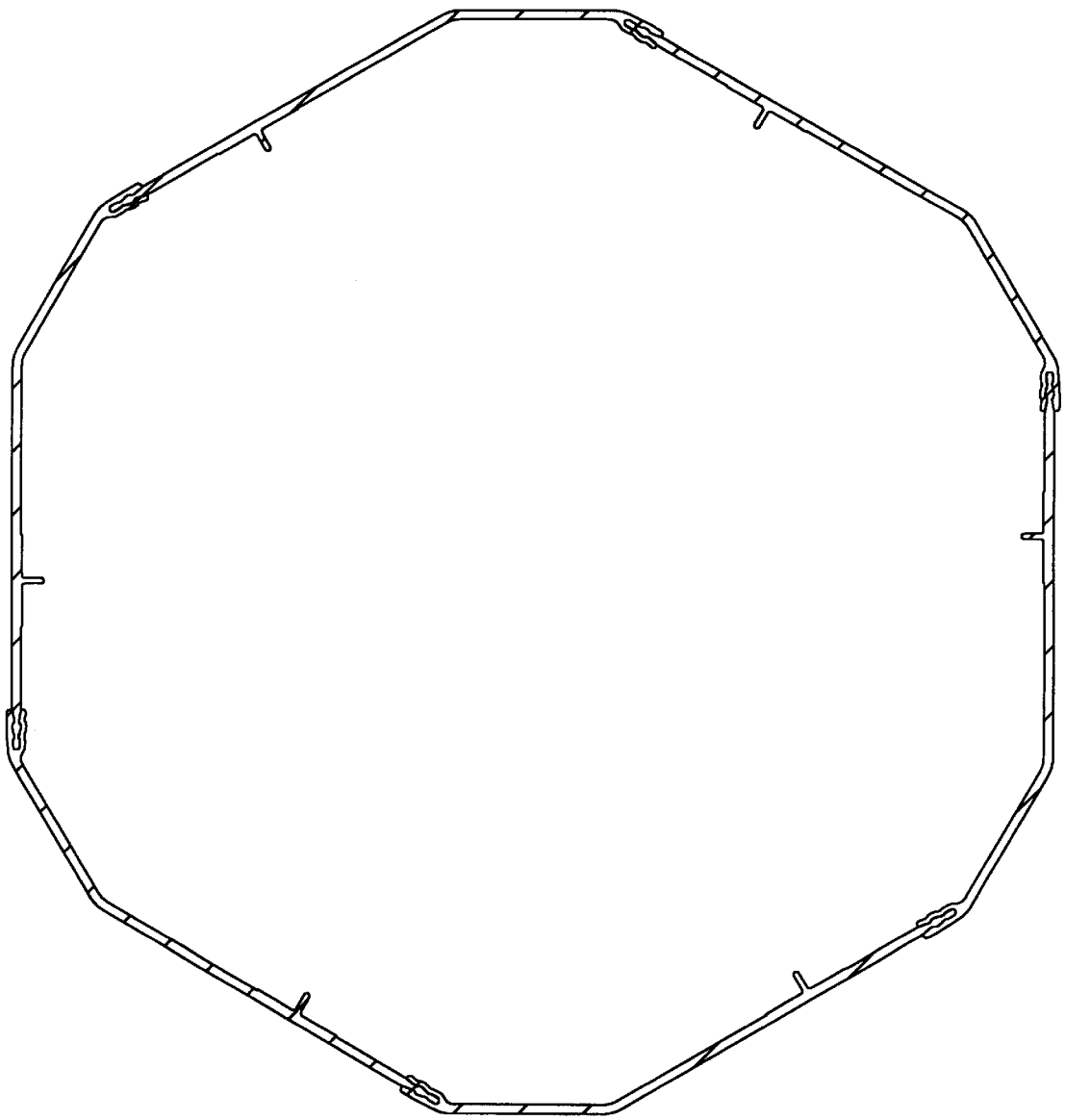
FIG. 10A, 10B and 10C are schematic cross sectional views taken at predetermined heights illustrating a tubular tapered composite pole formed from the protruded panels illustrated in FIGS. 9A and 9B.
Figure 10B:
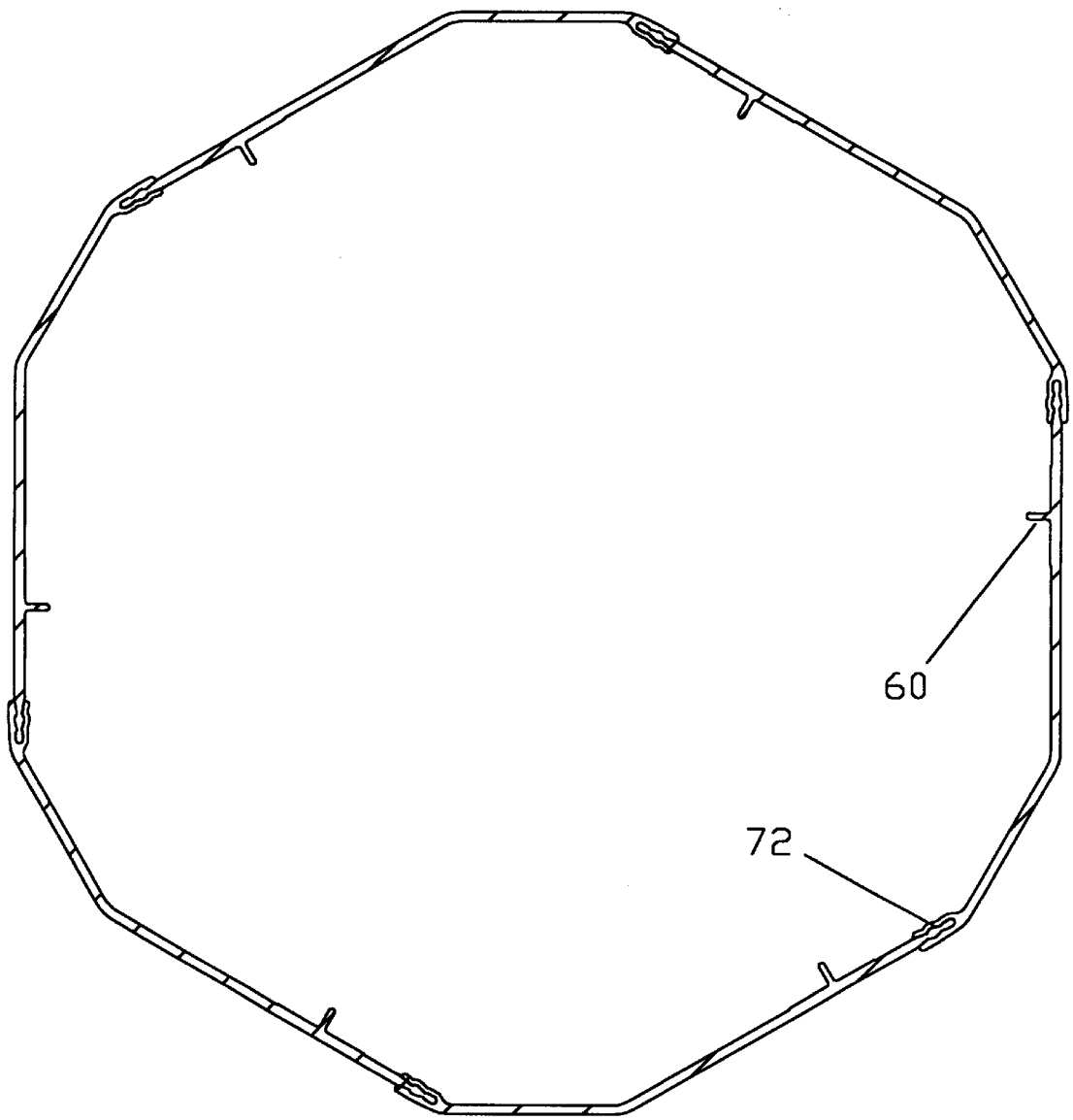
Figure 10C:
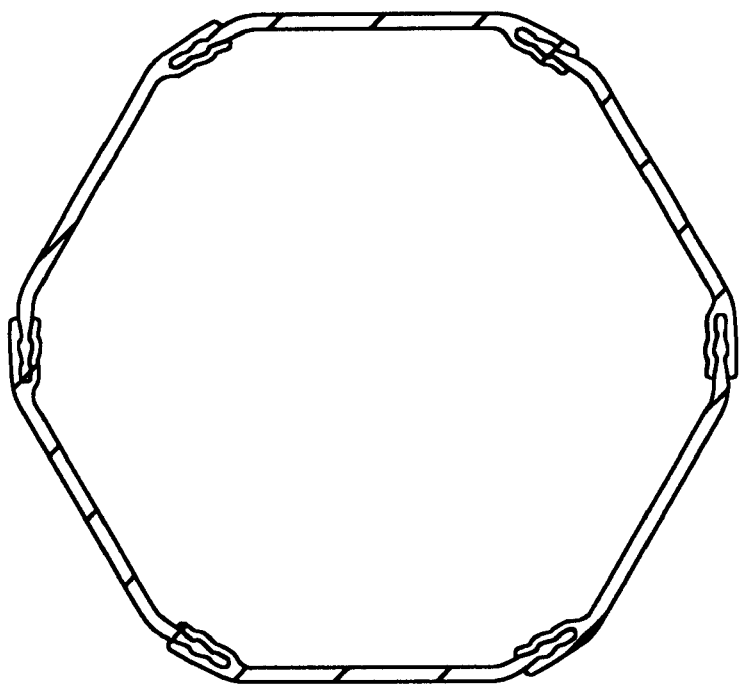

FIG. 10A is a cross section taken along the base of a tubular tapered composite pole such as illustrated in FIG. 1. FIG. 10B is a cross section taken at the groundline of the pole as installed in the ground. FIG. 10C is a cross section taken adjacent the top end of the pole.

Figure 11:
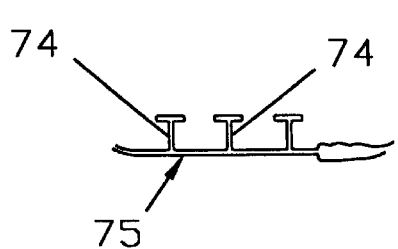
FIG 11 is a top plan view of a second alternative pultruded composite panel.
Figure 12:
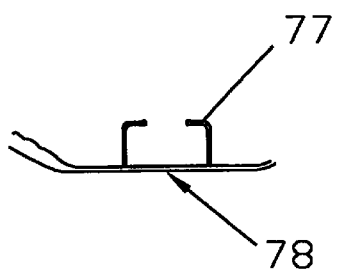
FIG. 12 is a top plan view of a third alternative pultruded composite panel.
Figure 13:
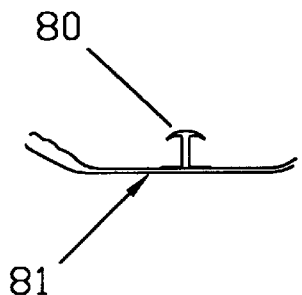
FIG. 13 is a top plan view of a fourth alternative pultruded composite panel.

There are several different ways of reinforcing or strengthening the panels to prevent thin wall buckling. Some of these systems are illustrated in FIGS. 11–16. In FIG. 11, a plurality of T-shaped reinforcing ribs 74 are shown extending from the inner surface of panel 75. In FIG. 12, a plurality of inverted L-shaped ribs 77 are shown extending outwardly from the inner surface of panel 78. In FIG. 13 a mushroom-shaped reinforcing rib 80 is shown extending from the inner surface of panel 81.

Figure 14:
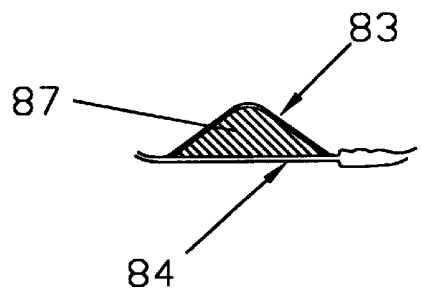
FIG. 14 is a top plan view of a fifth alternative pultruded composite panel.
Figure 15:
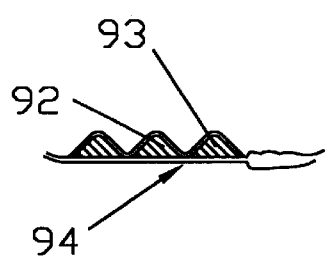
FIG. 15 is a top plan view of a sixth alternative pultruded composite panel.
Figure 16:
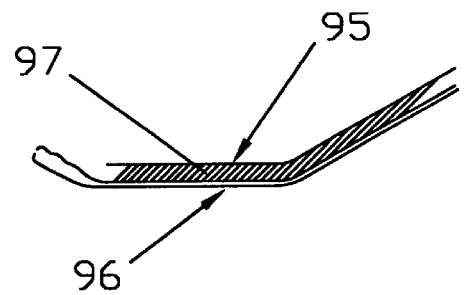
FIG. 16 is a top plan view of a seventh alternative pultruded composite panel.

Some other ways of reinforcing the pultruded panels is illustrated in FIGS. 14–16. An inverted V-shaped secondary panel 83 may be formed concurrently with the formation of panel 84. A chamber 86 that is formed between them may remain open or be filled with foam material 87. In FIG. 15, a corrugated secondary panel 90 may be integrally formed with panel 94 during the pultrusion process. This forms a plurality of longitudinally extending chambers 92 that may remain open or filled with foam 93. In FIG. 16 a mating secondary panel 95 can be spaced from primary panel 96 and a foam 97 used to fill the space between them.

Figure 17:
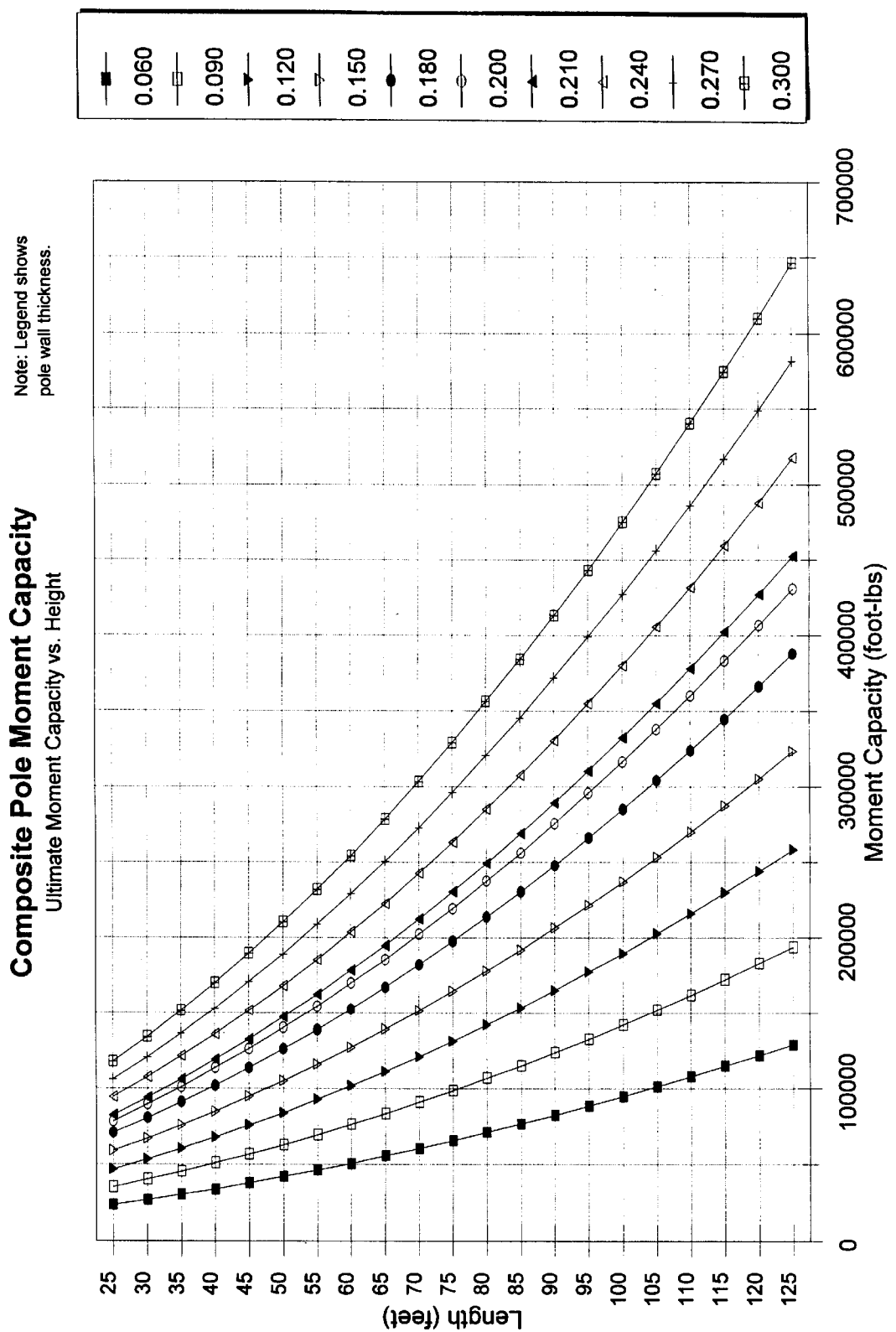
FIG. 17 is a graph showing the composite pole moment capacity for pultruded panels having various thicknesses Ti.

FIG. 17 is a graph showing the composite pole moment capacity for pultruded panels having various thicknesses T1.

What is claimed is:

1. A tubular tapered composite pole for supporting utility lines comprising:

a plurality of vertically oriented elongated primary panels each having an inner surface, an outer surface, a bottom edge, a top edge, a left side edge, a right side edge, a height (H1) in the range of 30–120 feet, a length (L1) along said bottom edge in the range of 6"–24", a length (L2) along said top edge in the range of 3"–16", a thickness (T1) in the range of 0.100–0.800 inches, and (L1) is greater than (L2) to give said panels a generally trapezoidal shape; said primary panels being formed of pultruded composite materials by a pultrusion process;

interlocking tongue and groove structure formed on said primary panels along their respective left and right side edges substantially along their entire height (H1); said groove structure having been formed on said primary panels during said pultrusion process and said groove structure has an outer jaw and an inner jaw each having inner surfaces configured to form a fir tree-shaped groove having at least first and second locking cavities; said tongue structure having been formed on said primary panels after said panels have been formed by said protrusion process; said tongue structure having a fir tree-shaped cross section having an outer surface, an inner surface and an outer end; a head portion is formed on said outer end, spaced inwardly from said head portion is formed a first outer surface machined groove and a first inner surface machined groove; spaced inwardly from the respective first outer surface machined groove and said first inner surface machined groove are a second outer surface machined groove and a second inner surface machined groove; a double sided tooth portion is formed between said respective first and second machined grooves; said head portion of a first one of said primary panels snap locks into said second locking cavity of a second one of said primary panels and said double sided tooth portion of said first one of said primary panels snap locks into said first cavity of said second one of said primary panels to form a double snap lock mechanical joint; and said thickness of said tongue structure is no greater than (T1) at any point; and said vertically oriented primary panels arranged to form a closed loop at their top edges and their bottom edges such that said tongue structure on each panel is interlockingly engaged in said groove structure of said adjacent panel; said primary panels having been assembled together by snapping laterally said adjacent tongue and groove structure together; said primary panels having planar outer surfaces and planar inner surfaces in their pultruded formed state; when said primary panels are assembled together said outer surfaces and said inner surfaces of said primary panels remain in a planar state and are not subjected to stresses that would occur if they were bent in order to assemble adjacent panels together.

2. A tubular tapered composite pole for supporting utility lines as recited in claim 1 further comprising an adhesive bonding agent applied to the mating surfaces of said fir tree joints prior to their being snapped together.

3. A tubular tapered composite pole for supporting utility lines as recited in claim 1 further comprising stiffener means on said inner surface of at least some of said vertically oriented primary panels.

4. A tubular tapered composite pole for supporting utility lines as recited in claim 3 wherein said stiffener means comprises a longitudinally extending inverted V-shaped secondary panel having left and right edges that are connected to said inner surface of said primary panels to form a chamber and said chamber is filled with a foam material.

5. A tubular tapered composite pole for supporting utility lines as recited in claim 3 wherein said stiffener means comprises a longitudinally extending corrugated secondary panel having left and right edges that are connected to said inner surface of said primary panels to form a plurality of vertically oriented chambers and said chambers are filled with a foam material.

6. A tubular tapered composite pole for supporting utility lines as recited in claim 3 wherein said stiffener means comprises at least one longitudinally extending reinforcing rib having a predetermined cross sectional configuration.

7. A tubular tapered composite pole for supporting utility lines as recited in claim 6 wherein said at least one reinforcing rib has a T-shaped cross-sectional configuration.

8. A tubular tapered composite pole for supporting utility lines as recited in claim 6 wherein said at least one reinforcing rib has an inverted L-shaped configuration.

9. A tubular tapered composite pole for supporting utility lines as recited in claim 6 wherein said at least one reinforcing rib has a mushroom-shaped configuration.

10. A method of forming a tubular tapered composite pole for supporting utility lines comprising the steps of:

a) forming a plurality of elongated rectangular blanks of pultruded composite material each having a height (H1) in the range of 30–120 feet, a left edge, a right edge, a top edge and a bottom edge; an interlocking structural groove is formed on both of said side edges of each blank substantially along their entire lengths during the time said blank was being formed by the pultrusion process;

b) cutting at a biased angle from said bottom edge of each said rectangular blank to said top edge of each said rectangular blank to form a pair of panels each having a generally trapezoidal shape; said panels each having a left edge, a right edge, a top edge and a bottom edge;

c) machining a tongue shaped interlocking structure substantially along the entire length of said biased angularly cut side edges of said panels; each of said panels having a length (L1) along said bottom edge in the range of 6"–24" and a length (L2) along said top edge in the range of 3"–16" and (L1) is greater than (L2) to give said panels a generally trapezoidal shape; said panels having a thickness (T1) in the range of 0.100–0.800 inches; and d) interlocking respective tongue and groove structure along the side edges of said panels to form a closed loop at their top and bottom edges and form a tubular tapered pole for supporting utility lines; said groove structure having been formed on said rectangular blanks during said pultrusion process and said groove structure has an outer jaw and an inner jaw each having inner surfaces configured to form a fir tree-shaped groove having at least first and second locking cavities; said tongue structure having been formed on a side edge of said panels after said rectangular blanks have been cut at a biased angle from said bottom edge of said blank to said top edge of said blank; said tongue structure having a fir tree-shaped cross section having an outer surface, an inner surface and an outer end; a head portion is formed on said outer end, spaced inwardly from said head portion is formed a first outer surface machined groove and a first inner surface machined groove; spaced inwardly from the respective first outer surface machined groove and said first inner surface machined groove are a second outer surface machined groove and a second inner surface machined groove; a double sided tooth portion is formed between said respective first and second machined grooves; said head portion snap locks into said second locking cavity and said double sided tooth portion snap locks into said first cavity to form a double snap lock mechanical joint; and said thickness of said tongue structure is no greater than (T1) at any point; and said vertically oriented primary panels arranged to form a closed loop at their top edges and their bottom edges such that said tongue structure on each panel is interlockingly engaged in said groove structure of said adjacent panel; said primary panels having been assembled together by snapping laterally said adjacent tongue and groove structure together; said primary panels having planar outer surfaces and planar inner surfaces in their pultruded formed state; when said primary panels are assembled together said outer surfaces and said inner surfaces of said primary panels remain in a planar state and are not subjected to stresses that would occur if they were bent in order to assemble adjacent panels together.

11. A pole formed by the method recited in claim 10 wherein said panels have an inner surface and there are stiffener means on said inner surfaces.

* * * * *